United States Patent
Sun et al.

(10) Patent No.: US 8,625,705 B2
(45) Date of Patent: Jan. 7, 2014

(54) DATA MODULATION AND DEMODULATION METHOD, SPECTRUM MANAGEMENT METHOD, APPARATUS AND SYSTEM

(71) Applicant: Huawei Technologies Co., Ltd., Shenzhen (CN)

(72) Inventors: Guolin Sun, Shenzhen (CN); Jaap van de Beek, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/742,097

(22) Filed: Jan. 15, 2013

(65) Prior Publication Data

US 2013/0129004 A1     May 23, 2013

Related U.S. Application Data

(63) Continuation of application No. PCT/CN2011/075406, filed on Jun. 7, 2011.

(30) Foreign Application Priority Data

Jul. 20, 2010   (CN) .......................... 2010 1 0234975

(51) Int. Cl.
H04B 15/00     (2006.01)

(52) U.S. Cl.
USPC ........... 375/285; 375/296; 375/340; 375/213; 704/207; 704/229; 704/230

(58) Field of Classification Search
USPC ......... 375/285, 296, 340, 213; 704/207, 229, 704/230
See application file for complete search history.

(56) References Cited

U.S. PATENT DOCUMENTS

| 2008/0233902 | A1 | 9/2008 | Pan et al. |
| 2009/0080549 | A1 | 3/2009 | Khan et al. |
| 2009/0128378 | A1* | 5/2009 | Cideciyan ...................... 341/59 |
| 2009/0157395 | A1* | 6/2009 | Su et al. ........................ 704/207 |
| 2011/0103316 | A1* | 5/2011 | Ulupinar et al. ............. 370/329 |
| 2011/0249708 | A1* | 10/2011 | Maca ........................... 375/213 |

FOREIGN PATENT DOCUMENTS

| CN | 101005324 A | 7/2007 |
| CN | 101146078 A | 3/2008 |
| CN | 101232356 A | 7/2008 |

OTHER PUBLICATIONS

Written Opinion of International Searching Authority issued in corresponding PCT Patent Application No. PCT/CN2011/075406, mailed Sep. 15, 2011.

International Searching Authority issued in corresponding PCT Patent Application No. PCT/CN2011/075406, mailed Sep. 15, 2011.

(Continued)

*Primary Examiner* — Eva Puente

(74) *Attorney, Agent, or Firm* — Brinks Gilson & Lione

(57) ABSTRACT

A data modulation method, a data demodulation method, and a method, include obtaining a target frequency band allocated to a transmitting terminal; calculating a precoding codeword index of spectrum shaping according to a codebook corresponding to a current radio scene and the target frequency band, where the codeword index corresponds to a return-to-zero subcarrier sequence, and the return-to-zero subcarrier sequence serves to calculate a precoding vector for modulating data; and sending the precoding codeword index out through broadcast.

17 Claims, 8 Drawing Sheets

(56) References Cited

OTHER PUBLICATIONS

ETSI, "Reconfigurable Radio Systems (RRS); Feasibility Study on Radio Frequency (RF) Performances for Cognitive Radio Systems Operating in UHF TV Band White Spaces" Draft ETSI TR 103067, V0.0.12, Feb. 2012.

Codier et al., "Cognitive Pilot Channel" Proceedings of WWRF15, Paris, 2005.

Buljore et al., "Architecture and Enablers for Optimized Radio Resource Usage in Heterogeneous Wireless Access Networks: The IEEE 1900.4 Working Group" IEEE Standards in Communications and Networking, IEE Communications Magazine, Jan. 2009.

Second Report and Order and Memorandum Opinion and Order, In the matter of Unlicensed Operation in the TV Broadcast Bands and Additional Spectrum for Unlicensed Devices Below 900 MHz and in the 3 GHz Band, Before the Federal Communications Commission. FCC 08-260, Adopted Nov. 4, 2008.

van de Beek et al., "*N*-continuous OFDM" IEEE Communications Letters. vol. 13, No. 1, Jan. 2009.

van de Beek et al., "Sculpting the Multicarrier Spectrum: A Novel Projection Precoder" IEEE Communications Letters, vol. 13, No. 12, Dec. 2009.

Office Action issued in corresponding European Patent Application No. 11786151.8, mailed Jul. 4, 2013, 4 pages.

Office Action issued in corresponding Chinese Patent Application No. 201010234975.2, mailed Jun. 26, 2013, 35 pages.

van de Beek, "Sculpting the Multicarrier Spectrum: A Novel Projection Precoder" IEEE Communications Letters, vol. 13, No. 12, Dec. 2009, 3 pages.

\* cited by examiner

DATA MODULATION AND DEMODULATION METHOD, SPECTRUM MANAGEMENT METHOD, APPARATUS AND SYSTEM

CROSS-REFERENCE TO RELATED APPLICATIONS

This application is a continuation of International Application No. PCT/CN2011/075406, filed on Jun. 7, 2011, which claims priority to Chinese Patent Application No. 201010234975.2, filed on Jul. 20, 2010, both of which are hereby incorporated by reference in their entireties.

FIELD OF TECHNOLOGY

The present application relates to the field of communication technologies, and in particular, to a data modulation and demodulation method, a spectrum management method, a spectrum management apparatus, and a spectrum management system.

BACKGROUND

With development of communication technology, cognitive radio attracts more and more attention. Cognitive radio is characterized by flexibility, intelligence, and re-configurability. By sensing external environment and learning from the environment through an artificial intelligence technology, the cognitive radio changes certain operation parameters (such as transmission power, carrier frequency, and modulation technology, etc.) purposefully in real time, and makes the internal state adaptable to the statistical change of received radio signals, thereby implementing highly reliable communication anytime anywhere and making efficient use of limited radio spectrum resources in a heterogeneous network environment. The essence of the cognitive radio is to implement dynamic spectrum allocation and spectrum sharing through spectrum sensing and the intelligent learning capability of the system.

To manage and allocate spectra to different systems dynamically, researchers put forward a concept of cognitive pilot channel (CPC, Cognitive Pilot Channel). It is very time-consuming and power-consuming to obtain radio environment information by only sensing and sweeping the spectra one by one in the frequency band from 400 MHz to 6 GHz. The CPC can manage and allocate the spectra in real time, and a terminal can obtain information on use of the radio spectrum by reading the CPC channel.

A Long Term Evolution (LTE, long term evolution) system can share a spectrum with TV channels or a GSM system, and so on, and different LTE operators can also share the spectrum. An LTE transmitting terminal is a data modulation apparatus for modulating and sending data, and an LTE receiving terminal is a data demodulation apparatus for receiving and demodulating data. For example, FIG. 1 is a schematic diagram of sharing a spectrum between the LTE and the TV channel, in which a busy frequency band in use, whose bandwidth is 8 MHZ, exists between two idle frequency bands. The frequency band on the left side of FIG. 1 has a bandwidth of 8 MHZ. The LTE system uses only frequency bands whose bandwidth is 5a MHZ (a is an integer) such as 5 MHZ, 10 MHZ, 15 MHZ, and so on. Therefore, the LTE system is unable to make full use of a frequency band whose bandwidth is 8 MHZ, and 2 MHZ or (2+5a) MHZ need to be added to the 8 MHZ to make up a 10 MHZ frequency band so that the frequency band can be made full use of by the LTE system.

In the conventional art, as a spectrum management apparatus, the CPC network senses the use of spectrum in a radio scenario, and sends the spectrum usage information to the transmitting terminal and the receiving terminal of the LTE system. The spectrum usage information includes specific locations and bandwidths of the idle frequency bands and the busy frequency bands among the frequency bands. The LTE transmitting terminal receives the spectrum usage information and converts the data, and then performs windowing and filtering and sends the processed data out through an idle frequency band according to the spectrum usage information of the CPC network; the LTE receiving terminal receives and demodulates the data. Artisans find that when the LTE system shares the spectrum, if the data is modulated through a traditional filtering method, discontinuous frequency bands generate considerable out-of-band emission. Therefore, artisans propose to pre-filter baseband signals when the LTE transmitting terminal modulates data to suppress out-of-band emission of discontinuous bands.

In researching and practicing the conventional art, the inventor finds that the LTE transmitting terminal pre-filters the baseband signals, but the pre-filtering operation is not notified to the LTE receiving terminal; with the receiving terminal being unaware of the pre-filtering operation, the demodulation error is considerable.

SUMMARY

A spectrum management method provided in an embodiment includes:

obtaining a target frequency band allocated to a transmitting terminal;

calculating a precoding codeword index of spectrum shaping according to a codebook corresponding to a current radio scene and the target frequency band, where the codeword index corresponds to a return-to-zero subcarrier sequence, and the return-to-zero subcarrier sequence serves to calculate a precoding vector for modulating data; and sending the precoding codeword index out through broadcast.

Correspondingly, a data demodulation method provided below includes:

obtaining a precoding codeword index;

obtaining a return-to-zero subcarrier sequence corresponding to the codeword index according to a codebook corresponding to a radio scene and the precoding codeword index;

obtaining a precoding vector according to the return-to-zero subcarrier sequence; and demodulating received data according to the precoding vector.

Correspondingly, a data modulation method further provided below includes:

obtaining a precoding codeword index;

obtaining a return-to-zero subcarrier sequence corresponding to the codeword index according to a codebook corresponding to a radio scene and the precoding codeword index;

obtaining a precoding vector according to the return-to-zero subcarrier sequence; and modulating data according to the precoding vector and sending the data out.

Correspondingly, a spectrum management apparatus includes:

an obtaining module, configured to obtain a target frequency band allocated to a transmitting terminal;

a calculating module, configured to calculate a precoding codeword index of spectrum shaping according to a codebook corresponding to a current radio scene and the target frequency band, where the codeword index corresponds to a return-to-zero subcarrier sequence, and the return-to-zero subcarrier sequence serves to calculate a precoding vector for modulating data; and a sending module, configured to send the precoding codeword index out through broadcast.

Correspondingly, a data demodulation apparatus includes:

an obtaining module, configured to obtain a precoding codeword index, where the precoding codeword index indicates a return-to-zero subcarrier sequence;

a calculating module, configured to obtain the return-to-zero subcarrier sequence corresponding to the codeword index according to a codebook corresponding to a radio scene and the precoding codeword index, and obtain and calculate a precoding vector according to the return-to-zero subcarrier sequence; and a demodulating module, configured to demodulate received data according to the precoding vector.

Correspondingly, a data modulation apparatus includes:

an obtaining module, configured to obtain a precoding codeword index;

a calculating module, configured to obtain a return-to-zero subcarrier sequence corresponding to the codeword index according to a codebook corresponding to a radio scene and the precoding codeword index, and obtain a precoding vector according to the return-to-zero subcarrier sequence; and a modulating module, configured to modulate data according to the precoding vector and send the data out.

Correspondingly, a spectrum management system provided in an embodiment includes:

a spectrum management apparatus, configured to: obtain a noise level of a current radio scene and an allocated target frequency band; calculate a precoding codeword index of spectrum shaping according to a codebook corresponding to the current radio scene and the target frequency band, where the codeword index corresponds to a return-to-zero subcarrier sequence, and the return-to-zero subcarrier sequence serves to calculate a precoding vector for modulating data; and send the precoding codeword index to each receiving terminal;

a data modulation apparatus, configured to: obtain the precoding codeword index; obtain the return-to-zero subcarrier sequence corresponding to the codeword index according to the codebook corresponding to the radio scene and the precoding codeword index; obtain the precoding vector according to the return-to-zero subcarrier sequence; and modulate data according to the precoding vector and send the data out; and a data demodulation apparatus, configured to: obtain the precoding codeword index; obtain the return-to-zero subcarrier sequence corresponding to the codeword index according to the codebook corresponding to the radio scene and the precoding codeword index; obtain the precoding vector according to the return-to-zero subcarrier sequence; and demodulate received data according to the precoding vector.

In the embodiments, the target frequency band allocated to the transmitting terminal is obtained, the codeword index of the precoding vector is calculated and broadcast, the codeword index corresponds to the return-to-zero subcarrier sequence of the transmitting terminal, and therefore, all terminals know the precoding codeword index and can calculate the precoding vector according to the codeword index. In this way, the transmitting terminal performs pre-filtering modulation for the subcarrier data according to the precoding vector. Besides, the receiving terminal calculates the precoding vector according to the precoding codeword index, thereby knowing the pre-filtering operation of the transmitting terminal; and demodulates data according to the precoding vector, thereby improving demodulation efficiency and implementing transparent transmission from the transmitting terminal to the receiving terminal.

BRIEF DESCRIPTION OF THE DRAWINGS

To make the technical solutions of embodiments or the technical solutions in the conventional art, the following outlines the accompanying drawings used in the embodiments. Evidently, the accompanying drawings are illustrative, and those skilled in the art can derive other drawings from them without any creative effort.

DETAILED DESCRIPTION

The following detailed description of the technical solutions of embodiments is given in conjunction with the accompanying drawings of embodiments to provide a thorough understanding of the claims. The drawings and the detailed description are merely representative of some particular embodiments of the claims rather than all the embodiments. Other embodiments, which can be derived by those skilled in the art from the embodiments given herein without any creative effort, shall fall within the protection scope of the claims.

The embodiments provide a spectrum management method that enables a data transmitting system to transmit data in a dynamic discontinuous spectrum environment, and also provide a spectrum management apparatus and a spectrum management system correspondingly, which are detailed below.

Figure 1:
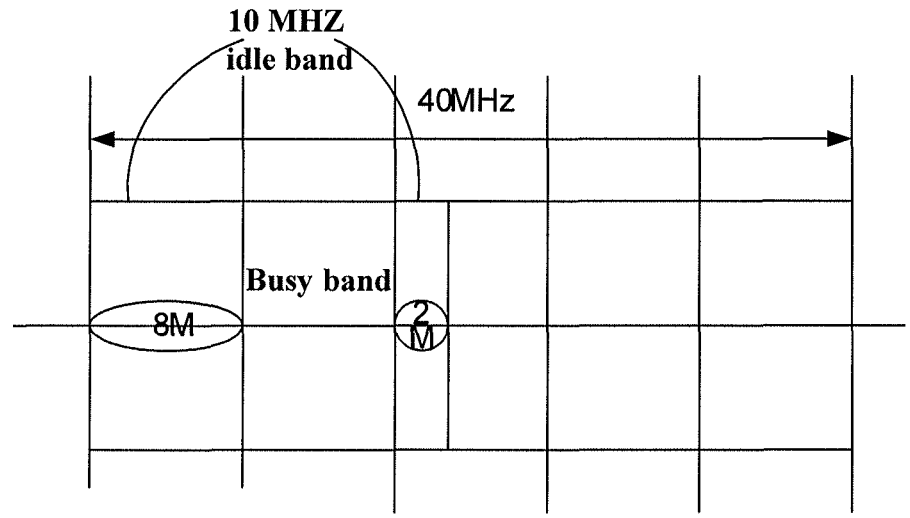
FIG. 1 is a schematic diagram of sharing spectrum between an LTE system and a TV channel in the conventional art.
Figure 2:
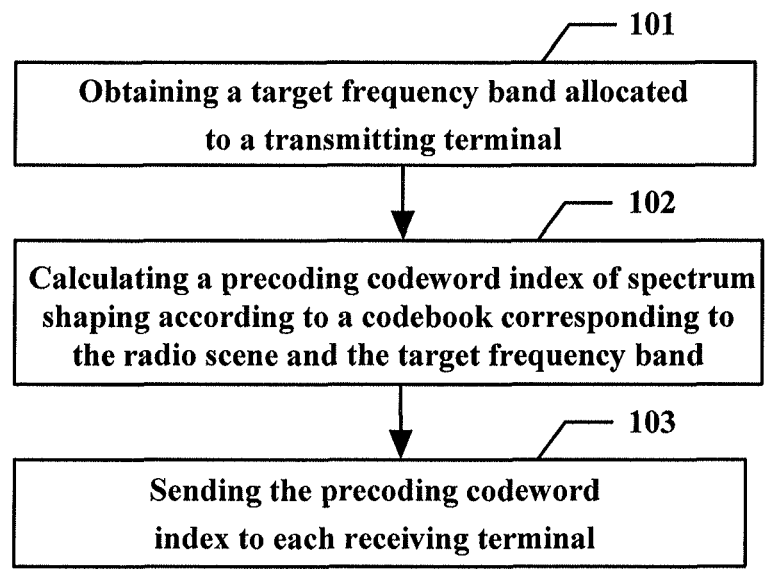
FIG. 2 is a flowchart of a spectrum management method according to a first embodiment.

A basic procedure of a spectrum management method in a first embodiment is shown in FIG. 2. The method in this embodiment includes:

Step 101: Obtaining a target frequency band allocated to a transmitting terminal.

A CPC network can sense spectrum usage of a current radio scene, and allocate an idle frequency band as a target frequency band to the transmitting terminal; or the CPC network receives the usage information of the radio scene sensed by the transmitting terminal, and determines the target frequency band accordingly.

Step 102: Calculating a precoding codeword index of spectrum shaping according to a codebook corresponding to the radio scene and the target frequency band.

Specifically, the codebook corresponding to the radio scene is a predefined standard parameter, and includes a codeword index and a corresponding return-to-zero subcarrier sequence. Each codeword corresponds to a spectrum mask shape. The codebook is obtained beforehand through training. Corresponding codeword indexes are created for the spectrum mask shapes corresponding to all possible spectrum distributions, and the return-to-zero subcarrier sequence corresponding to the codeword is obtained through an emulation test. Each return-to-zero subcarrier sequence serves to calculate a precoding vector in the radio scene.

An index of a finite set of finite return-to-zero frequencies is calculated and determined according to the codebook corresponding to the radio scene and the allocated target frequency band. The index is the precoding codeword index of spectrum shaping.

Figure 3:
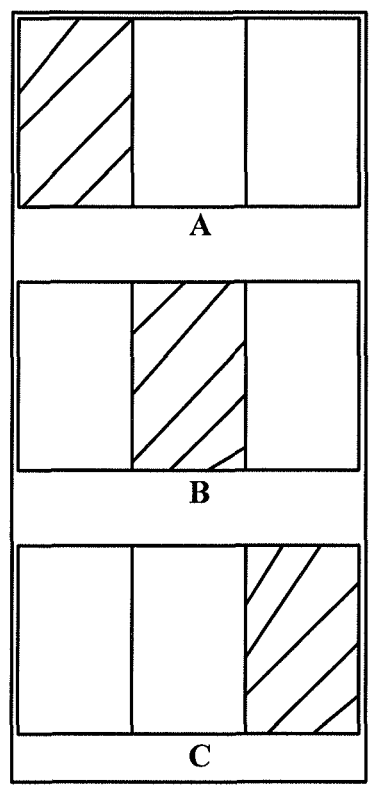
FIG. 3 is a schematic diagram of a codebook model that matches a target frequency band according to the first embodiment.
Figure 4:
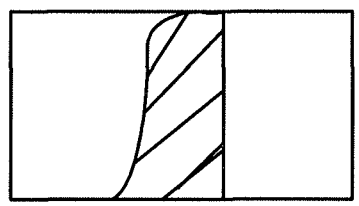
FIG. 4 is a schematic diagram of a target frequency band that matches a target spectrum according to the first embodiment.

Specifically, the steps of calculating the precoding codeword index are: obtaining the spectrum mask shape of the target frequency band according to the radio scene and the spectrum sensing result; and comparing the spectrum mask shape of the target frequency band with the spectrum mask shape corresponding to each codeword in the codebook, where the comparison may be performed by using a pattern matching algorithm; and outputting a codeword set of the spectrum mask shape closest to the spectrum mask shape of the target frequency band as a codeword index. For example, spectra are sampled in a target frequency band to obtain a sampled sequence; the sampled sequence is compared with spectrum occupancy sequences of all code words in the codebook, and the codeword index corresponding to the closest spectrum occupancy sequence is output as a precoding codeword index. The specific pattern matching methods may differ. Here we give only a simple example to describe the method of matching the spectrum mask according to the sampled sequence of the target frequency band. The ideal spectrum occupancy corresponding to three code words $0, 1$, and $2$ in the codebook is shown in FIG. 3, and the spectrum sensing measurement result is shown in FIG. 4, in which the oblique line part represents a busy frequency band. Through spectrum sampling, a sampled sequence e={e1 e2 ...} is obtained. It is assumed that the sampled sequence is e={0 1 0}. Therefore, the sampled sequence is compared with the codeword spectrum mask shapes of the sequences corresponding to A, B, and C in FIG. 3, and the shape shown in FIG. 4 is closest to B in FIG. 3, where $Index_{opt}=min=\|\hat{e}-e_i\|$ ($e_i$ is the sequence corresponding to each codeword in the codebook) represents a set of the code words corresponding to graph B. This set is the precoding codeword index and indicates the frequency return-to-zero sequence corresponding to the spectrum mask shape. The transmitter calculates and obtains precoding vector according to the frequency return-to-zero sequence corresponding to $Index_{opt}$.

Step 103: Sending the precoding codeword index out.

The precoding codeword index determined in step 102 is delivered to each terminal over a CPC or another control channel through broadcast. The transmitter calculates the precoding vector G according to the frequency return-to-zero sequence corresponding to $Index_{opt}$. After receiving the precoding codeword index, the receiving terminal calculates the precoding vector, knows pre-distortion operation of the transmitting terminal, and demodulates the data.

Through this embodiment, the codebook corresponding to the radio scene is obtained, the codeword index of the precoding vector is calculated, the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 5:
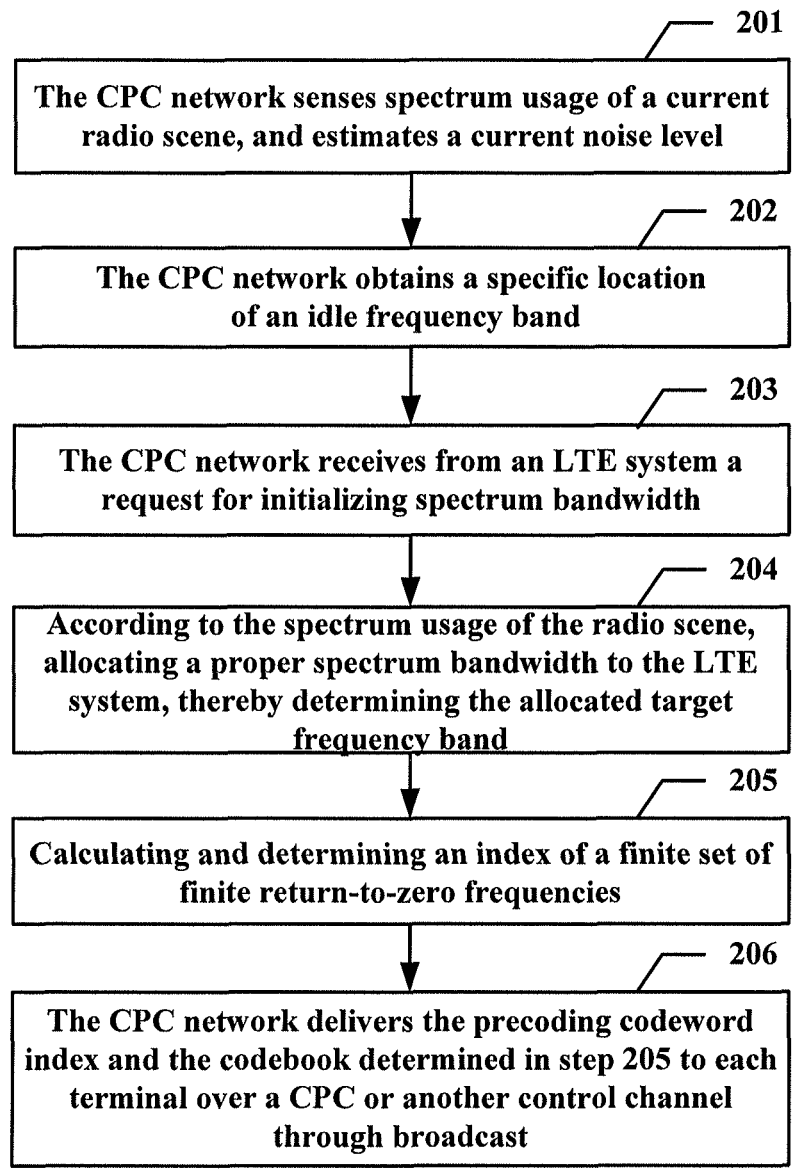
FIG. 5 is a flowchart of a spectrum management method according to a second embodiment.

For ease of understanding, the following expounds a spectrum shaping signaling method in an embodiment by taking a master-slave mode as an example. In the master-slave mode, the CPC network is a spectrum management apparatus, senses radio spectrum usage, and determines and allocates an idle target frequency band to the transmitting terminal and the receiving terminal in the LTE system. As shown in FIG. 5, a spectrum management method in a second embodiment includes the following steps:

Step 201: The CPC network senses spectrum usage of a current radio scene, and estimates a current noise level.

The CPC network senses the spectrum usage of the current radio scene, and estimates and measures an interference level acceptable to the master system dynamically.

Step 202: The CPC network obtains a specific location of an idle frequency band.

By sensing the spectrum usage of the radio scene, the CPC network knows the specific locations of the idle frequency bands and the busy frequency bands, and therefore, can determine the specific location of the idle frequency bands in real time.

Step 203: The CPC network receives from an LTE system a request for initializing spectrum bandwidth.

Step 204: According to the estimated noise level and the spectrum usage of the radio scene, making a selection in the idle frequency bands, and allocating a proper spectrum bandwidth to the LTE system, thereby determining the allocated target frequency band.

Step 205: The CPC network calculates and determines an index of a finite set of finite return-to-zero frequencies according to the codebook corresponding to the radio scene and the allocated target frequency band. The index is the precoding codeword index of spectrum shaping.

The codebook corresponding to the radio scene is a predefined standard parameter, and includes a codeword index and a corresponding return-to-zero subcarrier sequence. Each codeword corresponds to a spectrum mask shape. The codebook is obtained beforehand through training. Corresponding codeword indexes are created for the spectrum mask shapes corresponding to all possible spectrum distributions, and the return-to-zero subcarrier sequence corresponding to the codeword is obtained through an emulation test. Each return-to-zero subcarrier sequence serves to calculate a precoding vector in the radio scene.

An index of a finite set of finite return-to-zero frequencies is calculated and determined according to the codebook corresponding to the radio scene and the allocated target frequency band. The index is the precoding codeword index of spectrum shaping. Specifically, the steps of calculating the precoding codeword index are: the codeword set corresponding to the spectrum occupancy sequence closest to the spectrum mask shape of the target frequency band in the codebook is output as the precoding codeword index, according to the radio scene and the spectrum sensing result (spectrum mask shape of the target frequency band).

Step 206: The CPC network delivers the precoding codeword index determined in step 205 to each terminal over a CPC or another control channel through broadcast. After receiving the precoding codeword index, the receiving terminal may calculate the precoding vector according to the codeword index, thereby demodulating the received data.

Figure 6:
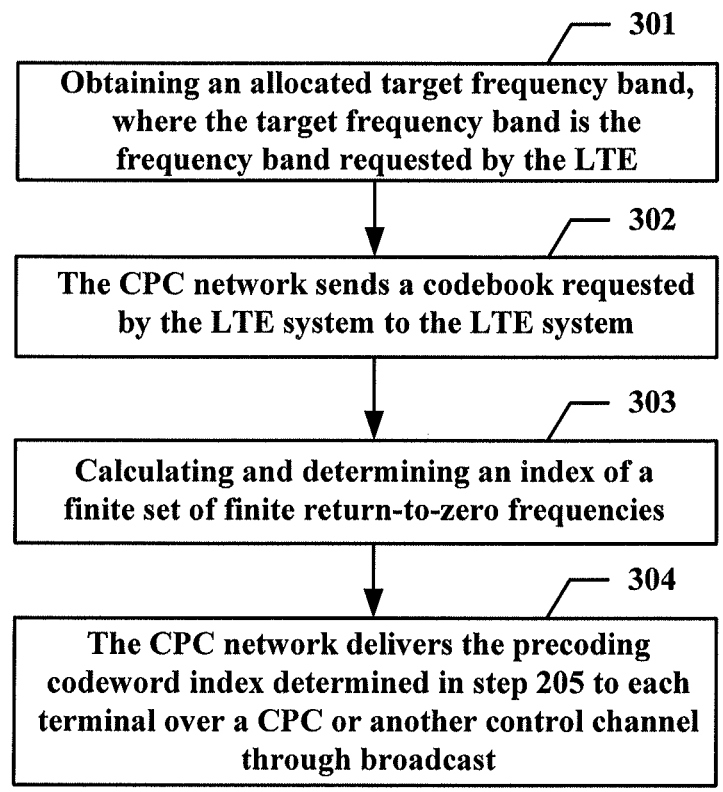
FIG. 6 is a flowchart of a spectrum management method according to a third embodiment.

The following expounds a spectrum shaping signaling method in this embodiment by taking an on-demand mode as an example. In the on-demand mode, the LTE system senses radio spectrum usage, determines a target frequency band, and requests the target frequency band from the CPC network (spectrum management apparatus). As shown in FIG. 6, a spectrum management method in a second embodiment includes the following steps:

Step 301: The CPC network receives spectrum usage of a current radio scene and a noise level, which are sensed by a LTE system, and receives a frequency band requested by the LTE and a codebook corresponding to the radio scene, thereby obtaining an allocated target frequency band. The target frequency band is the frequency band requested by the LTE.

Step 302: The CPC network sends a codebook requested by the LTE system to the LTE system.

Step 303: The CPC network determines a precoding codeword index and delivers it through broadcast.

The CPC network may calculate and determine an index of a finite set of finite return-to-zero frequencies according to the estimated noise level, the spectrum usage of the radio scene and the target frequency band requested by the CPC network. The detailed calculation method is the same as step 205 in the second embodiment. The index is the precoding codeword index of spectrum shaping.

Step 304: The CPC network delivers the precoding codeword index determined in step 303 to each terminal over a CPC or another control channel through broadcast. After receiving the precoding codeword index, the receiving terminal may calculate a precoding vector according to the codebook, thereby demodulating the received data.

Through this embodiment, the codebook corresponding to the radio scene is obtained, then the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 7:
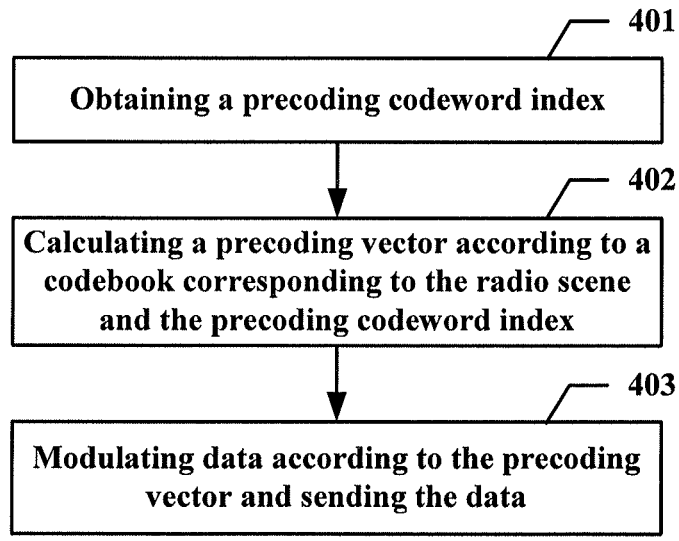
FIG. 7 is a flowchart of a data modulation method according to a fourth embodiment.

The following expounds a data modulation method provided in an embodiment, in which a transmitting terminal of an LTE system serves as an entity for executing the data modulation method. As shown in FIG. 7, the method includes the following steps:

Step 401: Obtaining a precoding codeword index.

The LTE system may sense a radio scene and a noise level, and calculate a precoding codeword index by determining a target frequency band; or, LTE system senses the spectrum usage of the radio scene and the noise level, and then the CPC calculates the precoding codeword index and returns it to the LTE system; or, the CPC network senses the long-term spectrum usage of the radio scene and the noise level, calculates the precoding codeword index, and returns it to the LTE system.

Step 402: Calculating a precoding vector according to a codebook corresponding to the radio scene and the precoding codeword index. The precoding codeword index may be broadcast by the CPC network, and the precoding vector can be calculated easily according to the precoding codeword index broadcast by the CPC network.

Step 403: Modulating data according to the precoding vector and sending the data out.

The subcarrier data are mapped according to the precoding vector, and then the operations including IFFT (Inverse Fast Fourier Transform) serial-to-parallel transformation, and so on are performed, and the data are transmitted out through antennas. Such a data modulation method differs from the traditional transmitting method of a windowing and filtering transmitter in that: in modulating the data according to the precoding vector, the out-of-band emission is suppressed and the spectrum is shaped dynamically through pre-distortion of baseband signals.

Through this embodiment, the codebook corresponding to the radio scene is obtained, and the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 8:
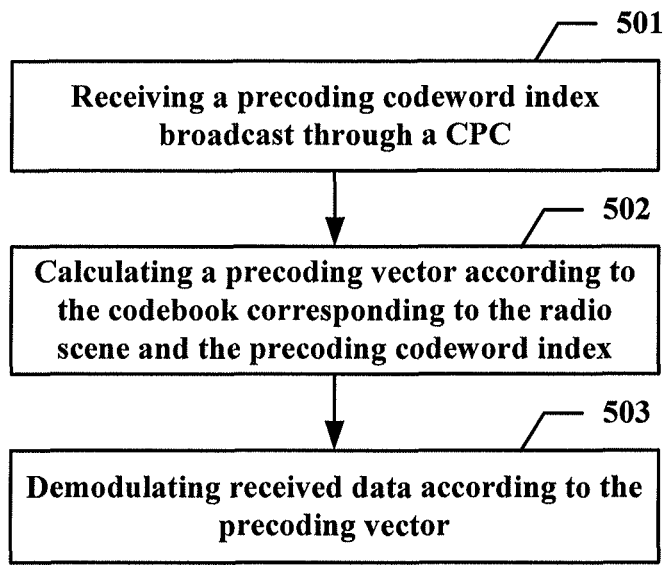
FIG. 8 is a flowchart of a data demodulation method according to a fifth embodiment.

The following expounds a data demodulation method provided in an embodiment, in which a receiving terminal of an LTE system serves as an entity for executing the method. As shown in FIG. 8, the method includes the following steps:

Step 501: Receiving a precoding codeword index broadcast through a CPC.

Step 502: Calculating a precoding vector according to a codebook corresponding to a radio scene and the precoding codeword index. In the on-demand mode, the codebook corresponding to the radio scene is requested and downloaded by the LTE terminal; in the master-slave mode, the codebook corresponding to the radio scene is determined by the CPC and delivered to the terminal.

Step 503: Calculating the precoding vector according to the codeword index, and demodulate received data according to the calculated precoding vector.

The receiving terminal knows the precoding vector, and therefore, knows the pre-distortion operation of the transmitting terminal. Through repeated iterative calculation, the error baseline possibly occurring on the demodulation side can be eliminated, and thus the transparent transmission can be realized.

Through this embodiment, the codebook corresponding to the radio scene is obtained, the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 9:
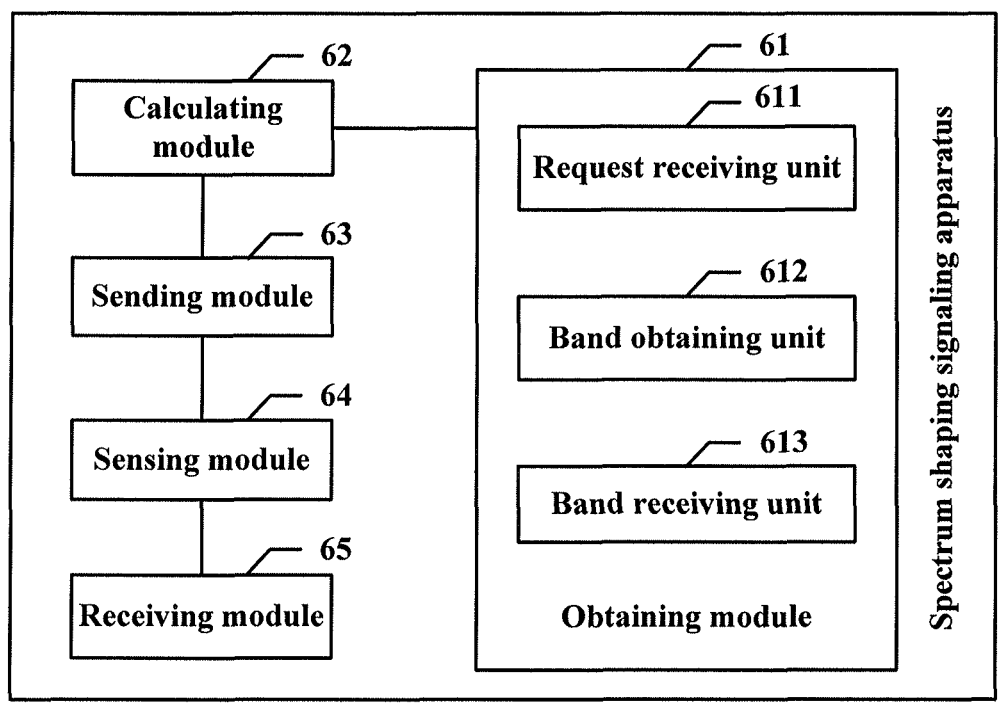
FIG. 9 is a flowchart of a spectrum management apparatus according to a sixth embodiment.

A spectrum management apparatus is provided in an embodiment. As shown in FIG. 9, the apparatus includes:

an obtaining module 61, configured to obtain a target frequency band allocated to a transmitting terminal;

a calculating module 62, configured to calculate a precoding codeword index of spectrum shaping according to a codebook corresponding to a current radio scene and the target frequency band, where the codeword index corresponds to a return-to-zero subcarrier sequence, and the return-to-zero subcarrier sequence serves to calculate a precoding vector for modulating data; and a sending module 63, configured to send the precoding codeword index out through broadcast.

Preferably, the obtaining module 61 includes:

a request receiving unit 611, configured to receive a band request from a transmitting terminal;

a band obtaining unit 612, configured to select a target frequency band allocated to the transmitting terminal among idle frequency bands according to the spectrum usage of the radio scene.

Preferably, the apparatus further includes:

a sensing module 64, configured to sense the spectrum usage of the current radio scene, where the spectrum usage of the radio scene includes specific locations of idle frequency bands and busy frequency bands in the current radio scene.

Preferably, the obtaining module 61 further includes:

a frequency band receiving unit 613, configured to receive the frequency band request from the transmitting terminal, where the frequency band request includes a target frequency band requested by the transmitting terminal; and use the target frequency band requested by the transmitting terminal as an allocated target frequency band.

Preferably, the apparatus further includes:

a receiving module 65, configured to receive a codebook download request from the transmitting terminal or the receiving terminal.

The sending module 63 is further configured to send the codebook corresponding to the current radio scene to the transmitting terminal or the receiving terminal.

Through this embodiment, the codebook corresponding to the radio scene is obtained, and the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 10:
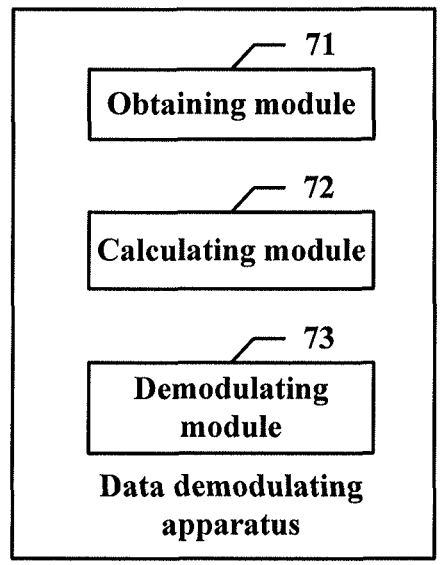
FIG. 10 is a schematic structural diagram of a data modulation apparatus according to a seventh embodiment.

A data demodulation apparatus is provided in an embodiment. As shown in FIG. 10, the apparatus includes:

an obtaining module 71, configured to obtain a precoding codeword index;

a calculating module 72, configured to obtain a return-to-zero subcarrier sequence corresponding to the codeword index according to a codebook corresponding to a radio scene and the precoding codeword index, and obtain and calculate a precoding vector according to the return-to-zero subcarrier sequence; and a demodulating module 73, configured to demodulate received data according to the precoding vector.

Through this embodiment, the codebook corresponding to the radio scene is obtained, and the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 11:
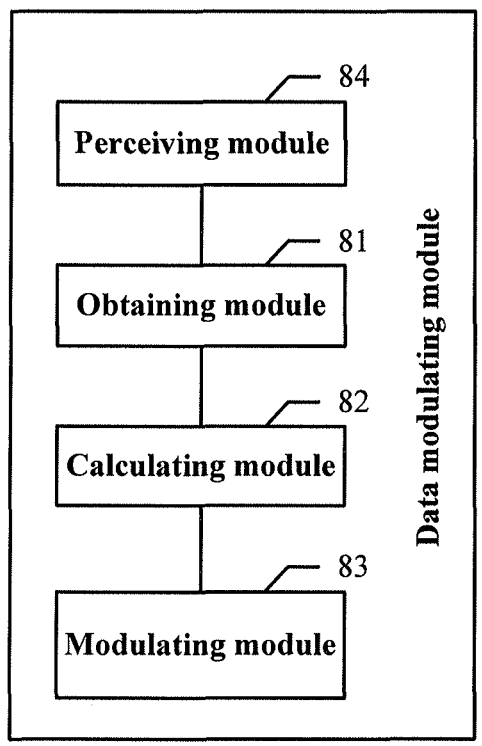
FIG. 11 is a schematic structural diagram of a data demodulation apparatus according to an eighth embodiment.

A data modulation apparatus is provided in an embodiment. As shown in FIG. 11, the data modulation apparatus includes:

an obtaining module 81, configured to obtain a precoding codeword index; a calculating module 82, configured to obtain a return-to-zero subcarrier sequence corresponding to the codeword index according to a codebook corresponding to a radio scene and the precoding codeword index, and obtain a precoding vector according to the return-to-zero subcarrier sequence; and a modulating module 83, configured to modulate data according to the precoding vector and send the data.

Preferably, the apparatus further includes:

a sensing module 84, configured to sense a radio scene.

The calculating module 82 is further configured to calculate a target frequency band and estimate a noise level according to the radio scene.

Through this embodiment, the codebook corresponding to the radio scene is obtained, and the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Figure 12:
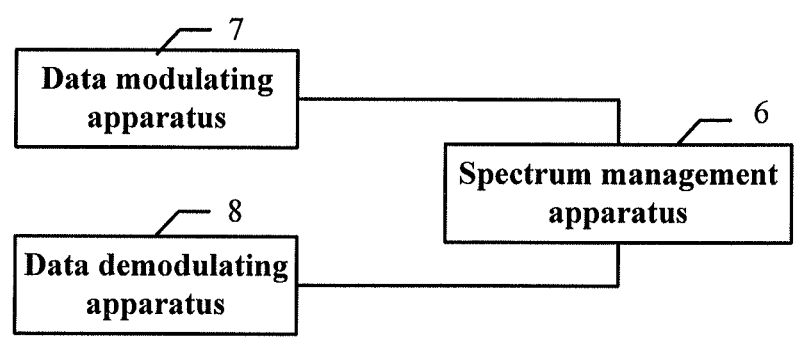
FIG. 12 is a schematic structural diagram of a spectrum shaping signaling system.

A spectrum shaping signaling system is provided in an embodiment. As shown in FIG. 12, the system includes:

a spectrum management apparatus 6, configured to: obtain a noise level of a current radio scene and an allocated target band; calculate a precoding codeword index of spectrum shaping according to a codebook corresponding to the current radio scene and the target band, where the codeword index corresponds to a return-to-zero subcarrier sequence, and the return-to-zero subcarrier sequence serves to calculate a precoding vector for modulating data; and send the precoding codeword index to each receiving terminal;

a data modulating apparatus 7, configured to: obtain the precoding codeword index; obtain the return-to-zero subcarrier sequence corresponding to the codeword index according to the codebook corresponding to the radio scene and the precoding codeword index, and obtain a precoding vector according to the return-to-zero subcarrier sequence; and modulate data according to the precoding vector and send the data.

a data demodulation apparatus 8, configured to: obtain the precoding codeword index; obtain the return-to-zero subcarrier sequence corresponding to the codeword index according to the codebook corresponding to the radio scene and the precoding codeword index; obtain the precoding vector according to the return-to-zero subcarrier sequence; and demodulate received data according to the precoding vector.

Figure 13:
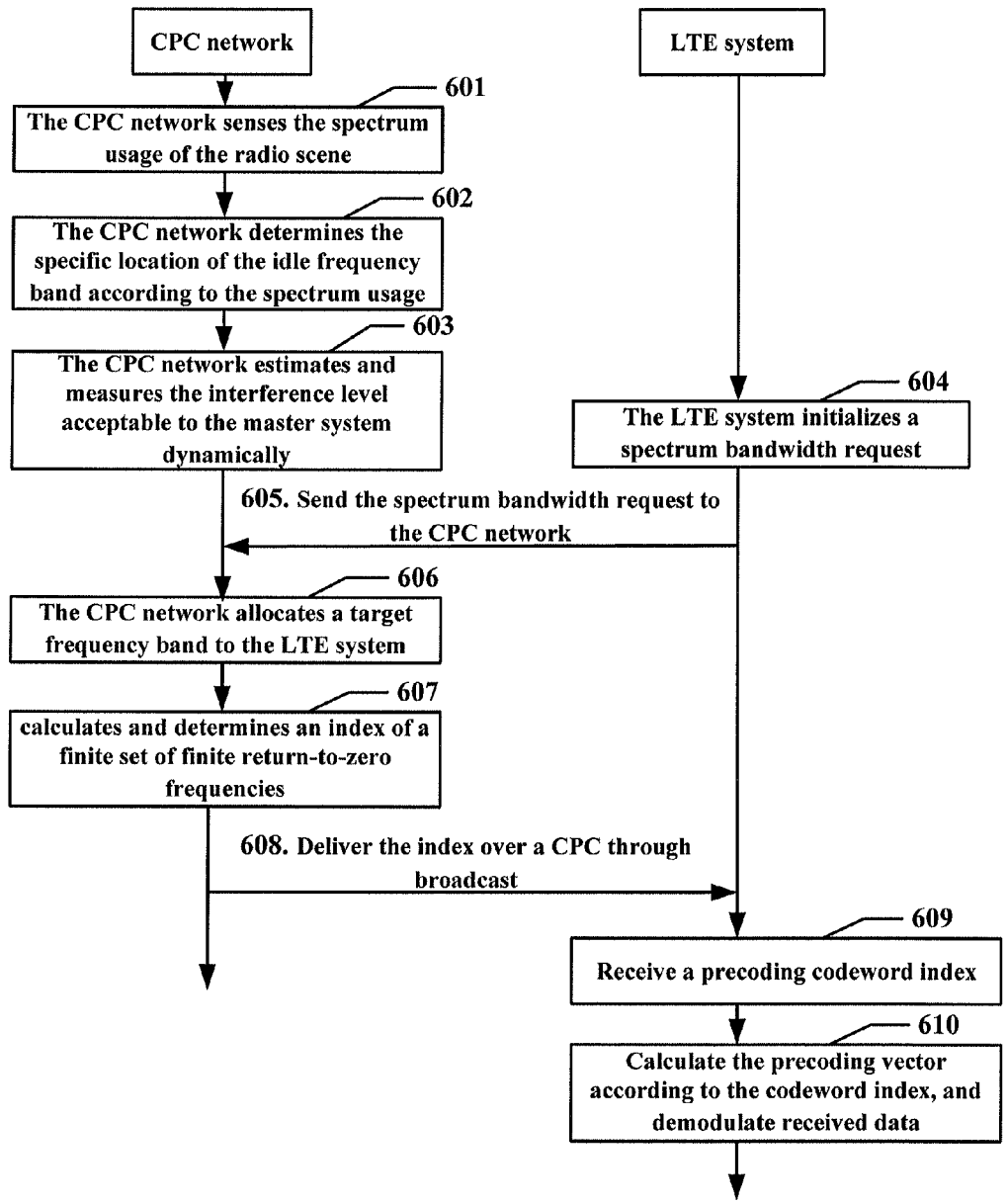
FIG. 13 is a schematic diagram of application scene 1 of a spectrum shaping signaling system.

For better comprehensibility, the following expounds the foregoing embodiments with reference to specific application scenarios:

Application Scenario 1:

As shown in FIG. 13, an LTE system in a master-slave mode occupies a TV (television) band; a transmitting terminal in the LTE system serves as a data modulation apparatus, a receiving terminal in the LTE system serves as a data demodulation apparatus, and the CPC network serves as a spectrum management apparatus. The LTE system is an OFDM (Orthogonal Frequency Division Multiplexing) system with a 20 MHZ standard bandwidth, and includes 1200 subcarriers.

Step 601: The CPC network senses the spectrum usage of the radio scene.

Step 602: The CPC network determines the specific location of the idle frequency band according to the spectrum usage.

Step 603: The CPC network estimates and measures the interference level acceptable to the master system dynamically. The interference caused by spectrum gaps in different locations onto the TV channel should not be higher than −40 dB.

Step 604: The LTE system initializes a spectrum bandwidth request.

Step 605: The LTE system sends the spectrum bandwidth request to the CPC network.

Step 606: According to results obtained in step 601, step 602, and step 603, the CPC network allocates a target frequency band to the LTE system, and extracts the in-band TV channels with the bandwidth of 8 MHZ from 4 different locations. Such TV channels are non-idle channels.

Step 607: The CPC network obtains a precoding codeword index through matching against the codebook according to the target frequency band determined in step 606. Based on the precoding codeword index, an index of a finite set of finite return-to-zero frequencies may be determined, in which, 600 subcarriers are reset to zeros. The codeword index is shown in the following table.

TABLE 1

| Codeword in codebook | Return-to-zero frequency sequence according to algorithm design [kHz] |
|---|---|
| 0 | −8130 −8115 −3780 −3765 585 600 |
| 1 | −6630 −6615 −2280 −2265 2085 2100 |
| 2 | −5130 −5115 −780 −765 3585 3600 |
| 3 | −3630 −3615 735 750 5085 5100 |

The index shown in Table 1 is a precoding codeword index; 0, 1, 2, and 3 in the first column are code words in the codebook; and the right-side column shows return-to-zero sequences. Based on the return-to-zero sequence in each row, a precoding vector can be calculated and available for the data modulation apparatus to modulate data. The LTE system calculates 4 precoding vectors according to the index in Table 1, and modulates the data according to the precoding vectors to generate the spectrum shown in FIG. 12.

Step 608: The CPC network delivers the precoding codeword index and the codebook corresponding to the radio scene through a CPC or another control channel.

Step 609: Each receiving terminal in the LTE system receives the index and codebook broadcast in step 604.

Step 610: Each receiving terminal in the LTE system calculates a precoding vector according to the received index and codebook, and demodulates the received data.

Application Scenario 2:

An LTE system in an on-demand mode occupies a GSM frequency band; the transmitting terminal in the LTE system serves as a data modulation apparatus, the receiving terminal in the LTE system serves as a data demodulation apparatus, and the CPC network serves as a spectrum management apparatus.

Step 701: The LTE system senses the spectrum usage of the radio scene to determine the specific location of the target frequency band, and extracts in-band GSM channels from 4 different locations. Such GSM channels are non-idle channels.

Step 702: The LTE system estimates and measures the interference level acceptable to the master system dynamically. The interference caused by spectrum gaps in different locations onto the TV channel should not be higher than −50 dB.

Step 703: The LTE system downloads the codebook corresponding to the radio scene through a CPC.

Step 704: The CPC network calculates and determines an index of a finite set of finite return-to-zero frequencies according to the target frequency band requested by the data modulation apparatus of the LTE system. The index is the codeword index shown in the following table.

TABLE 2

| Codeword in codebook | Return-to-zero frequency sequence according to algorithm design [kHz] |
|---|---|
| 0 | −8220 −8205 −7980 −7965 −7725 −7710 |
| 1 | −6720 −6705 −6480 −6465 −6225 −6210 |
| 2 | −5220 −5205 −4980 −4965 −4725 −4710 |
| 3 | −3720 −3705 −3480 −3465 −3225 −3210 |

The index shown in Table 2 above is a precoding codeword index; 0, 1, 2, and 3 in the first column are code words in the codebook; and the right-side column shows return-to-zero sequences. Based on the return-to-zero sequence in each row, a precoding vector can be calculated and available for the data modulation apparatus to modulate data.

Step 705: The CPC network delivers the index and the codebook corresponding to the radio scene through a CPC or another control channel.

Step 706: Each receiving terminal in the LTE system receives the index broadcast in step 604.

Step 707: Each receiving terminal in the LTE system determines a precoding vector according to the received index, and demodulates the received data.

Through this embodiment, the codebook corresponding to the radio scene is obtained, and the codeword index of the precoding vector is calculated, such that the precoding vector is obtained, and the data is modulated or demodulated according to the precoding vector. Therefore, the spectrum is sensed and allocated dynamically according to the radio scene, the out-of-band emission is reduced, the interference is reduced between users who share the spectrum, and the receiving terminal's capability of demodulating data is improved.

Persons of ordinary skill in the art should understand that all or part of the steps in various methods in the foregoing embodiments may be implemented by a program instructing relevant hardware. The program may be stored in a computer readable storage medium, and the storage medium may be a ROM, RAM, magnetic disk, or CD-ROM.

The contents above expound the method, the apparatus, and the system disclosed in embodiments. While various embodiments are provided to understand the claims, these embodiments are merely exemplary. It is apparent that those skilled in the art can make modifications and variations to the embodiments. Such modified embodiments are understood to fall within the scope of the claims.

What is claimed is:

1. A spectrum management method comprising:
   obtaining a target frequency band allocated to a transmitting terminal;
   calculating a precoding codeword index that defines a spectrum shaping according to a codebook corresponding to a current radio scene and the target frequency band, wherein the codeword index corresponds to a return-to-zero subcarrier sequence, and the return-to-zero subcarrier sequence serves to calculate a precoding vector for modulating data; and
   sending the precoding codeword index out through broadcast.

2. The method according to claim 1, wherein the obtaining the target frequency band allocated to the transmitting terminal comprises:
   receiving a frequency band request from the transmitting terminal; and
   selecting the target frequency band allocated to the transmitting terminal among idle frequency bands according to spectrum usage of the radio scene.

3. The method according to claim 2, wherein before receiving the frequency band request, the method further comprises:
sensing a spectrum usage of the current radio scene, wherein the spectrum usage of the radio scene comprises specific locations of idle frequency bands and busy frequency bands in the current radio scene.

4. The method according to claim 1, wherein the obtaining the target frequency band allocated to the transmitting terminal comprises:
receiving a frequency band request from the transmitting terminal, wherein the frequency band request comprises the target frequency band requested by the transmitting terminal, and the target frequency band requested by the transmitting terminal is used as the allocated target frequency band.

5. The method according to claim 4, further comprising:
receiving a codebook download request from the transmitting terminal or a receiving terminal; and
sending a codebook corresponding to the current radio scene to the transmitting terminal or the receiving terminal, wherein the codebook comprises a codeword index and a corresponding return-to-zero subcarrier sequence.

6. A data demodulation method comprising:
obtaining a precoding codeword index;
obtaining a return-to-zero subcarrier sequence corresponding to the codeword index according to a codebook corresponding to a radio scene and the precoding codeword index;
obtaining a precoding vector according to the return-to-zero subcarrier sequence; and
demodulating received data according to the precoding vector.

7. A data modulation method comprising:
obtaining a precoding codeword index;
obtaining a return-to-zero subcarrier sequence corresponding to the codeword index according to a codebook corresponding to a radio scene and the precoding codeword index;
obtaining a precoding vector according to the return-to-zero subcarrier sequence; and
modulating data according to the precoding vector and communicating the data to a destination.

8. The data modulation method according to claim 7, further comprising:
sensing spectrum usage of the radio scene;
estimating a noise level; and
obtaining a target frequency band according to the spectrum usage of the radio scene and the noise level.

9. A spectrum management apparatus comprising:
an obtaining module configured to obtain a target frequency band allocated to a transmitting terminal;
a calculating module configured to calculate a precoding codeword index that defines a spectrum shaping according to a codebook corresponding to a current radio scene and the target frequency band, wherein the codeword index corresponds to a return-to-zero subcarrier sequence, and the return-to-zero subcarrier sequence serves to calculate a precoding vector for modulating data; and
a sending module configured to send the precoding codeword index out through broadcast.

10. The apparatus according to claim 9, wherein the obtaining module comprises:
a request receiving unit configured to receive a frequency band request from the transmitting terminal;
a frequency band obtaining unit configured to select a target frequency band allocated to the transmitting terminal among idle frequency bands according to spectrum usage of the radio scene.

11. The spectrum management apparatus according to claim 10, further comprising:
a sensing module configured to sense the spectrum usage of the current radio scene, wherein the spectrum usage of the radio scene comprises specific locations of idle frequency bands and busy frequency bands in the current radio scene.

12. The spectrum management apparatus according to claim 11, wherein the obtaining module further comprises:
a frequency band receiving unit configured to:
receive the frequency band request from the transmitting terminal, wherein the frequency band request comprises a target frequency band requested by the transmitting terminal; and
use the target frequency band requested by the transmitting terminal as an allocated target frequency band.

13. The apparatus according to claim 12, further comprising:
a receiving module configured to receive a codebook download request from the transmitting terminal or a receiving terminal,
wherein the sending module is further configured to send a codebook corresponding to the current radio scene to the transmitting terminal or the receiving terminal, wherein the codebook comprises a codeword index and a corresponding return-to-zero subcarrier sequence.

14. A data demodulation apparatus comprising:
an obtaining module configured to obtain a precoding codeword index, wherein the precoding codeword index indicates a return-to-zero subcarrier sequence;
a calculating module configured to obtain the return-to-zero subcarrier sequence corresponding to the codeword index according to a codebook corresponding to a radio scene and the precoding codeword index, and obtain and calculate a precoding vector according to the return-to-zero subcarrier sequence; and
a demodulating module configured to demodulate received data according to the precoding vector.

15. A data modulation apparatus comprising:
an obtaining module configured to obtain a precoding codeword index;
a calculating module configured to obtain a return-to-zero subcarrier sequence corresponding to the codeword index according to a codebook corresponding to a radio scene and the precoding codeword index, and obtain a precoding vector according to the return-to-zero subcarrier sequence; and
a modulating module configured to modulate data according to the precoding vector and communicate the data to a destination.

16. The data modulation apparatus according to claim 15, further comprising:
a sensing module configured to sense spectrum usage of the radio scene, and estimate a noise level,
wherein the obtaining module is further configured to obtain a target frequency band according to the spectrum usage of the radio scene and the noise level.

17. A spectrum management system comprising:
a spectrum management apparatus configured to:
obtain a noise level of a current radio scene and an allocated target frequency band;
calculate a precoding codeword index of spectrum shaping according to a codebook corresponding to the current radio scene and the target frequency band, wherein the codeword index corresponds to a return-to-zero subcarrier sequence, and the return-to-zero subcarrier sequence serves to calculate a precoding vector for modulating data; and send the precoding codeword index to each receiving terminal;

a data modulation apparatus configured to:
   obtain the precoding codeword index;
   obtain the return-to-zero subcarrier sequence corresponding to the codeword index according to the codebook corresponding to the radio scene and the precoding codeword index;
   obtain the precoding vector according to the return-to-zero subcarrier sequence; and modulate data according to the precoding vector and send the data out; and a data demodulation apparatus configured to:
   obtain the precoding codeword index;
   obtain the return-to-zero subcarrier sequence corresponding to the codeword index according to the codebook corresponding to the radio scene and the precoding codeword index;
   obtain the precoding vector according to the return-to-zero subcarrier sequence; and
   demodulate received data according to the precoding vector.

* * * * *